H. E. MAINE.
PORTABLE SELF CONTAINED WEIGHING AND MEASURING APPARATUS.
APPLICATION FILED JUNE 20, 1911.
1,015,739.  
Patented Jan. 23, 1912.
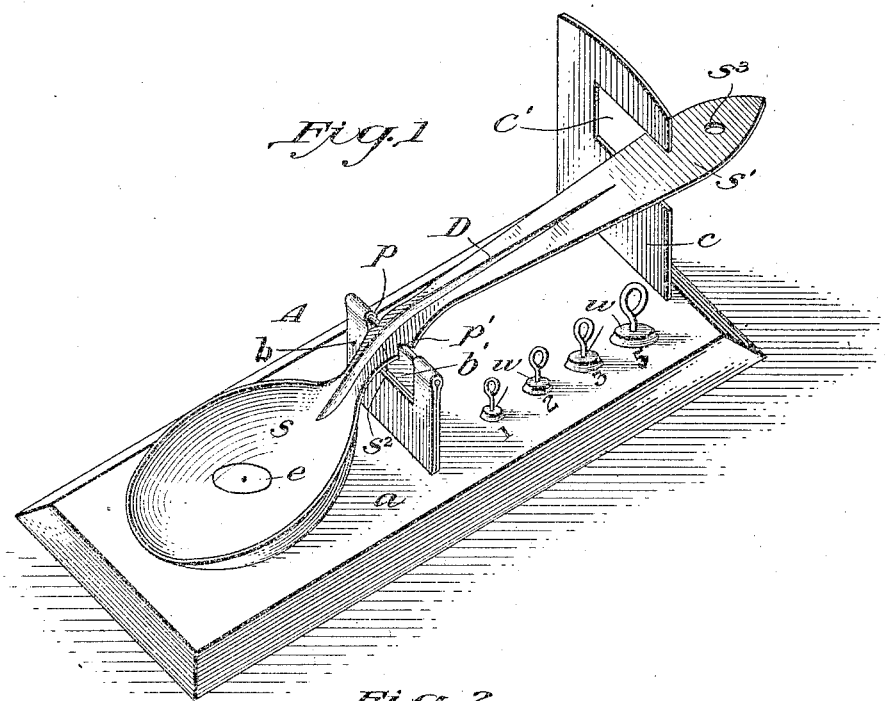
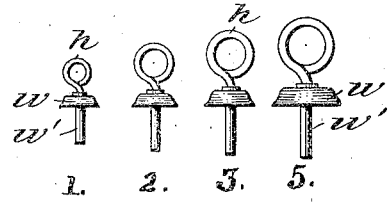
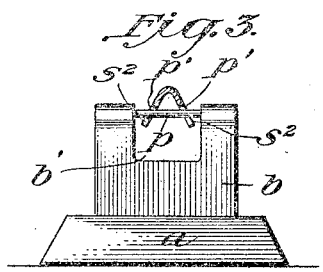
Witnesses:
Inventor:  
Herbert E. Maine  
ATTORNEY.

UNITED STATES PATENT OFFICE.

HERBERT E. MAINE, OF PROVIDENCE, RHODE ISLAND.

PORTABLE SELF-CONTAINED WEIGHING AND MEASURING APPARATUS.

1,015,739.  Specification of Letters Patent.  Patented Jan. 23, 1912.

Application filed June 20, 1911. Serial No. 634,341.

*To all whom it may concern:*

Be it known that I, HERBERT E. MAINE, a citizen of the United States, residing at Providence, in the county of Providence and State of Rhode Island, have invented certain new and useful Improvements in Portable Self-Contained Weighing and Measuring Apparatus, of which the following is a specification.

My invention relates to an improved portable self-contained weighing and measuring apparatus, adapted more especially for household use in connection with the culinary art; and it consists in the novel construction and combination of the parts or elements comprising the same, all as more fully hereinafter set forth and claimed.

The object of the invention is to provide a portable, inexpensive, and at the same time accurate weighing device, the same including in its construction a normally self-positioning, counterpoised, removably fulcrumed and tiltable combined weigh-beam or lever member, arranged to receive and carry a removable, non-slidable weight unit at one end, and a recessed or ladle-like extension secured to or integral with the lever member, adapted to receive therein the material or substance to be weighed, as for example, loose tea, &c., until the quantity thus deposited equals or exactly balances the corresponding weight unit mounted in the opposite end of the lever.

By means of the employment of my improved weighing system the exact predetermined amount or charge of ingredient, such as loose tea, to produce a certain number of cups of the infusion or beverage, may be quickly and accurately weighed out without loss, the user or operator immediately thereafter lifting the charge and weight-carrying lever bodily from its pivot and emptying the tea into a suitable vessel or percolator. Obviously, the device is adapted for weighing, with equal facility and accuracy, uniform quantities of other substances, as sugar, salt, spices, &c., corresponding with any prearranged standard units having relation to certain volumes of water, flour, &c., as the case may be. Upon replacing the lever (then minus the charge and weight unit) on its pivot, it immediately assumes the equipoise position.

In the accompanying sheet of drawings, Figure 1 is a perspective view of a weighing apparatus embodying my invention, showing the pivoted weighing arm or lever in the normally level or balanced position; Fig. 2 represents a side elevation of a series of detached weights or units varying in size; and Fig. 3 is a transverse sectional view of the lever, taken through the corresponding portion of the supporting pivot.

The device as a whole is indicated by A and consists of the base $a$; the central vertical pivot-carrying standard $b$; the rear standard $c$; the lever or beam D, removably positioned in said members $b$—$c$; and a series of weights $w$, varying in size, adapted to be removably seated in the rear end of the said member D.

The form of the base $a$ is preferably rectangular, and may be made of wood or other suitable material, as thin sheet metal. At or near the center of the base, longitudinally, is fixed the transversely disposed vertical bracket or standard $b$, its upper portion terminating in ears in which is secured the horizontal pivot-pin or fulcrum $p$, as clearly represented in Figs. 1 and 3. To the rear end (which, as drawn, is the right end) of the base is fixed a thin vertical plate $c$; the latter being parallel with said member $b$ and having an open slot $c^1$ therein. The base is also provided with a series of vertical holes adapted to receive the lower members $w^1$ of the respective weights $w$.

The beam or lever D may have any suitable form, as desired. In the drawings it has the general appearance of a spoon or ladle, the free end of its handle part $s^1$ having a small hole $s^3$ therethrough, adapted to removably receive the stem or shank $w^1$ of the weights $w$. The opposite end of the lever is provided with a concave or bowl-shaped pan $s$, having say the normal capacity of a table-spoon, adapted to receive the material or substance to be weighed. At a certain point, being the normal center of gravity or equilibrium, the lever, which is preferably V-shaped transversely, has each of the downwardly inclined sides $s^2$ provided with a V-shaped notch $p^1$ arranged to freely receive and be engaged by the pivot-pin $p$. The exact center of the bowl $s$ is designated by a prick-mark or other suitable center-denoting character, surrounded by a small circle $e$. When the lever D is normally supported and balanced on the fulcrum $p$ the bowl or pan $s$ will lie substantially level, the handle part $s^1$ at the same time then extending substantially horizontally and centrally through the narrow open notch $c^1$ of the vertical plate $c$. The upper and lower edges of the opening $c^1$ serve as stops for limiting the tilting movements of the lever, thus preventing the accidental spilling of the material or goods from the pan during the weighing operation, and at the same time preventing undue angular vibrations. The fixed relation of the weight-positioning hole $s^3$ and the said center or circle $e$ to the fulcrum are such as to insure greater accuracy in weighing out the material.

The drawing represents the device provided with four portable weights $w$ varying in size, and numbered 1, 2, 3, and 5, respectively, the said numbers designating the number of units, or say cups of tea which each weight denotes.

Assuming now the apparatus to be in the normal or balanced position, substantially as represented in Fig. 1, the manner of operation may be described as follows: If the user desires to weigh out a predetermined quantity of material (say tea, for the purpose of illustration) to produce five cups of fluid tea, the weight numbered 5 is first removed from the base and its stem $w^1$ inserted in the aperture $s^3$ of the weighing lever, thereby depressing the latter until arrested by the lower edge of the notched opening $c^1$; he next places or introduces the loose tea into the center portion of the temporarily slightly elevated bowl $s$ until the amount thus deposited produces an equilibrium of the parts and just balances the weight No. 5. The operator then removes the thus loaded member D from its supporting point $p$ and empties the tea directly into the tea-pot, followed by replacing the lever on the pivot, the notched bearing $p^1$ serving to facilitate its replacement. The weight, adapted to be manipulated by the handle $h$, may be disconnected from the lever before the latter is removed from its support.

The element D is also adapted to be directly employed as a dry and liquid-measuring member, the weights then being omitted. In such application of the device the pan $s$, having, as before stated, the standard capacity and dimensions of the bowl of a tablespoon, may be utilized in lieu of other measuring means for accurately measuring or scooping out spoonfuls of coffee or other substance, as the case may be, since the form, arrangement and manner of mounting the member D are such as to permit of its ready removal from the pivot, as well as for its normal replacement.

I claim as my invention, and desire to secure by United States Letters Patent:—

1. In a portable combined weighing and measuring device, the combination with a base adapted to receive a plurality of weights, and having an upright member secured to the base terminating at its upper end in a pivot or fulcrum, of a weigh-lever removably balanced on said fulcrum, said lever having one end perforated to receive a weight, the other end of the lever being adapted to temporarily receive the substance or material to be weighed or measured, and a stop for limiting the upward tilting movement of the lever when the latter is being normally employed.

2. In a weighing apparatus of the general character described, the combination of a suitably mounted, horizontally disposed pivot-pin, and a weigh-lever having its arm substantially V-shaped transversely, the beveled sides thereof having V-shaped notches alining with each other, adapted to engage said pivot-pin, whereby the lever is capable of being readily removable bodily from its pivot, and means for limiting the tilting movements up and down of the lever.

3. In a combined weighing and measuring apparatus the combination with a portable base having an upright member terminating at its upper end in a pivot or fulcrum, of the weigh-lever or element D herein described normally and removably balanced on said fulcrum, one end of said lever having a relatively small aperture therein located a predetermined distance from the fulcrum to receive a weight, and having the other or opposite end portion of the lever recessed or bowl-shaped and adapted to receive the material to be weighed or measured, the bottom of the recessed part having a permanent mark or character designating its center.

In testimony whereof I have affixed my signature in presence of two witnesses.

HERBERT E. MAINE.

Witnesses:
 GEO. H. REMINGTON,
 CALVIN H. BROWN.